United States Patent [19]
Parrish et al.

[11] Patent Number: 5,556,169
[45] Date of Patent: Sep. 17, 1996

[54] MULTI-LAYER CONFORMABLE SUPPORT SYSTEM

[76] Inventors: Milton E. Parrish, 587 Ibold Rd., Loveland, Ohio 45140; Ethan J. Mesmer, 4582 Roxbury Cir. Apt., 1B, Batavia, Ohio 45103

[21] Appl. No.: 275,915

[22] Filed: Jul. 15, 1994

[51] Int. Cl.$^6$ .................................................. A47C 27/10
[52] U.S. Cl. ............................ 297/452.28; 297/452.41; 297/452.35; 5/913; 5/713
[58] Field of Search .................. 297/452.28, 452.26, 297/452.41, 452.32, 452.35; 5/450, 913, 911; 264/222, DIG. 30

[56] References Cited

U.S. PATENT DOCUMENTS

| | | |
|---|---|---|
| 2,053,538 | 9/1936 | Scott et al. . |
| 3,462,763 | 8/1969 | Schneider . |
| 3,608,961 | 9/1971 | Von Heck . |
| 3,689,945 | 9/1972 | Laerdal . |
| 3,766,579 | 10/1973 | Shields ........................ 5/450 |
| 4,038,700 | 8/1977 | Gyory . |
| 4,045,830 | 9/1977 | Loeb et al. . |
| 4,114,214 | 9/1978 | VonHeck . |
| 4,213,213 | 7/1980 | Burnett . |
| 4,234,982 | 11/1980 | Bez et al. . |
| 4,347,213 | 8/1982 | Rogers, Jr. . |
| 4,493,877 | 1/1985 | Burnett . |
| 4,566,137 | 1/1986 | Gooding . |
| 4,586,200 | 5/1986 | Poon . |
| 4,592,588 | 6/1986 | Isono et al. . |
| 4,638,518 | 1/1987 | Barbulla ........................ 5/450 X |
| 4,655,505 | 4/1987 | Kashiwamura et al. . |
| 4,657,003 | 4/1987 | Wirtz . |
| 4,768,250 | 9/1988 | Kato . |
| 4,885,811 | 12/1989 | Hayes . |
| 4,890,885 | 1/1990 | Grossmann . |
| 4,944,044 | 7/1990 | Zarotti . |
| 5,008,965 | 4/1991 | Vrzalik ........................ 5/450 X |
| 5,056,162 | 10/1991 | Tirums . |
| 5,121,756 | 6/1992 | Koledin . |
| 5,159,726 | 11/1992 | Bloch et al. . |
| 5,181,279 | 1/1993 | Ross . |
| 5,419,612 | 5/1995 | Rassekhi ........................ 297/452.41 X |
| 5,433,506 | 7/1995 | Jensen ........................ 297/452.41 X |

FOREIGN PATENT DOCUMENTS

| | | |
|---|---|---|
| 101529 | 2/1984 | European Pat. Off. . |
| 113613 | 7/1984 | European Pat. Off. . |
| 154582 | 9/1985 | European Pat. Off. .......... 297/452.41 |
| 332925 | 9/1989 | European Pat. Off. . |
| 375206 | 6/1990 | European Pat. Off. . |
| 489310 | 6/1992 | European Pat. Off. . |
| 536055 | 4/1993 | European Pat. Off. . |
| 1333913 | 6/1963 | France ........................ 297/452.41 |
| 677961 | 12/1964 | Italy . |
| 5049524 | 3/1993 | Japan ........................ 297/452.28 |
| 5049522 | 3/1993 | Japan ........................ 297/452.28 |
| WO91/08682 | 6/1991 | WIPO . |

*Primary Examiner*—Peter M. Cuomo
*Assistant Examiner*—David E. Allred
*Attorney, Agent, or Firm*—Wood, Herron & Evans, P.L.L.

[57] ABSTRACT

The multi-layer support system for conforming to and supporting an object comprises a first, compartmented, fluid-sealed layer containing a plurality of beads which are movable within the first layer when fluid is introduced and which are inhibited from motion when an amount of the fluid is evacuated from the first layer, the first layer is conformable to the surface contours of a body or object. A second compartmented, fluid-sealed layer is adjacent the first layer and moves when air is introduced therein, the first and second layers are coupled together and preferably co-extensive such that movement of a portion of the second layer causes movement of the portion of the first layer to further mold the first layer. Introducing fluid to the first and second layers conforms the first layer to the body and subsequently evacuating fluid from the first layer sets the first layer beads to provide a rigid, contoured surface which follows the contours of the body and supports the body. An alternative embodiment utilizes layers containing individual, fluid-sealed compartments which may be selectively filled and evacuated independently from one another and at different pressures to selectively conform the layers.

25 Claims, 3 Drawing Sheets

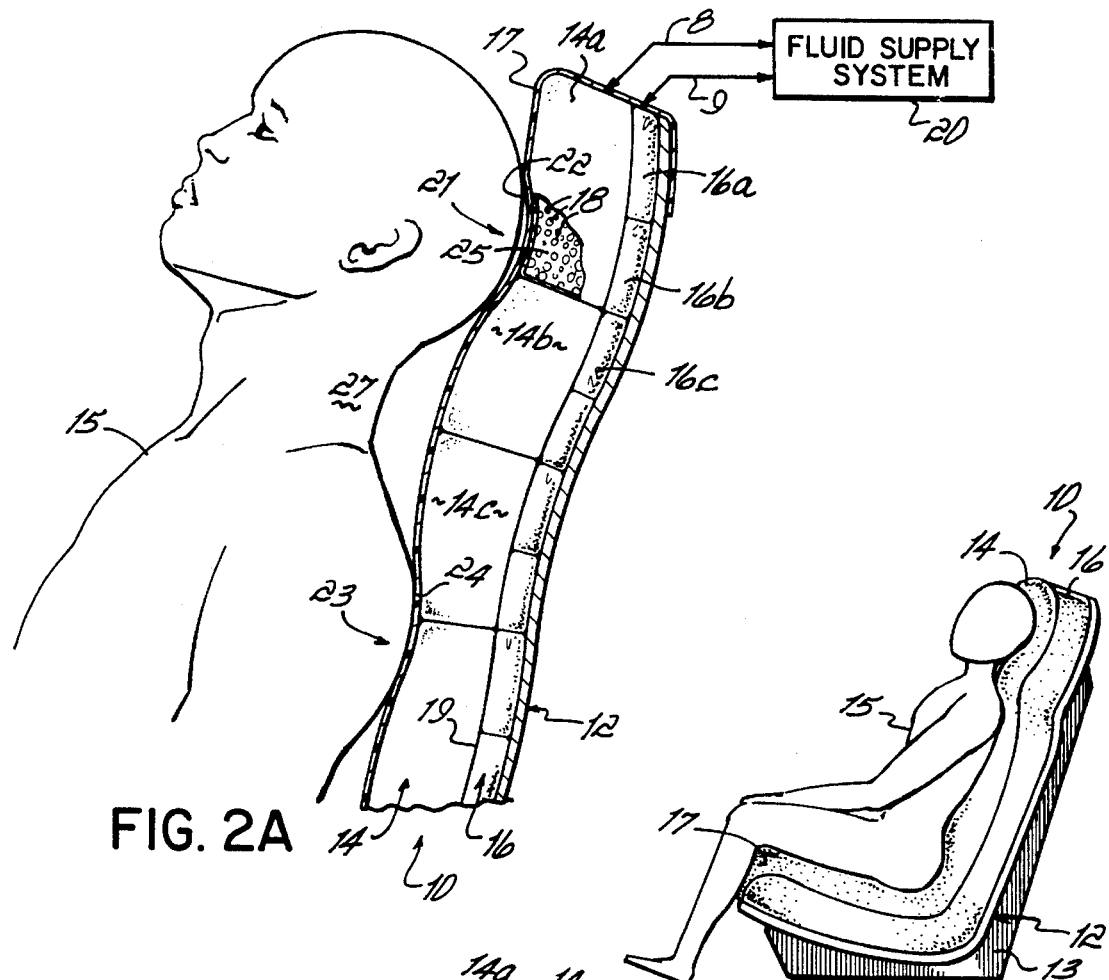
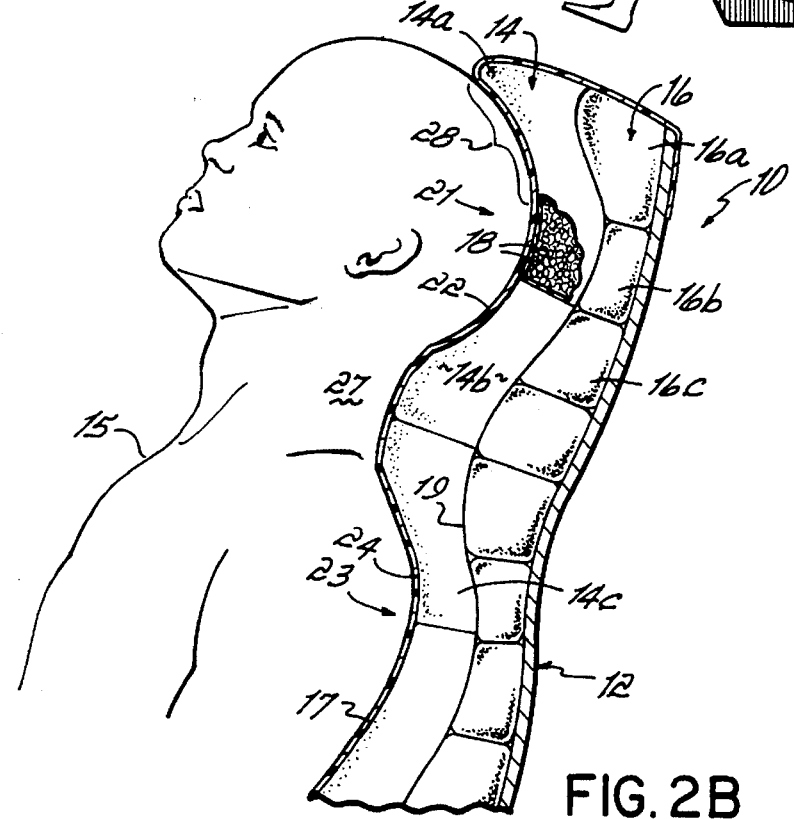

MULTI-LAYER CONFORMABLE SUPPORT SYSTEM

FIELD OF THE INVENTION

This invention relates generally to structures which conform to and support various objects, and more specifically to a multi-layer support system which conforms to the contours of the human body to support and protect portions of the body or the whole body in motion or at rest.

BACKGROUND OF THE INVENTION

The human body is supported and protected both at rest and in motion by numerous different support structures. Most notable are structures such as seats, beds and the like which support the human body including the torso, appendages and the head in a variety of standing and nonstanding positions under a variety of different circumstances. Accordingly, there is always a need for improvements in seating and support structures which comfortably and securely support the human body.

Conventional seating and support structures often fall short of their goal to provide comfort, conformability and security. Traditional soft structures utilize cushions which are indented by the weight of the person seated thereon, and thus conform somewhat to the body contours of that person. However, soft structures do not provide adequate support. Attempts have been made in the past to provide rigid seating and support structures which conform to the contours of the human body. Such seats have support surfaces grooved or indented therein to fit the specific contours of the human body, such as the head and neck and the back and buttocks areas. While rigid, conformed seat structures provide some support, they are usually mass produced and marketed, and thus, they are generally manufactured to provide support for the average body shape and/or size. That is, currently available rigid seating and support structures are designed to fit and support the largest percentage of people, and consequently, they sacrifice individual comfort, complete support and sometimes even safety in the process. As may be appreciated, mass produced rigid seating and support structures simply cannot be made, to fit every body, shape, and size perfectly using current technology.

Other attempts have been made to make conformable seating which constantly adjusts to a variety of different body shapes and sizes. One such prior art seating structure involves the use of cushions and cushion sections filled with beadlike material or beads. The individual beads move around each other within the cushion such that the cushion conforms to take on a shape generally conforming to the body contours of the seated person. Once the beads are adequately displaced and the cushion has conformed to the contours of the body, air or some other fluid is removed by vacuum or otherwise evacuated from the cushion and the motion of the beads is inhibited. This freezes the cushion into a rigid, contoured shape with a surface which maintains the contour shape of the body.

The prior art conformable seating and support structures, however, also have various shortcomings. For example, a person sitting in such a seat usually has to vigorously move around to adequately displace the beads and conform the seat. More specifically, the seated person has to push or otherwise drive their body into the seat structure to indent various cushion portions while making various other cushion portions rise to fit the unique and individual contours of the person's body. Such vigorous motion is tiring and unnecessary and may not even be feasible if the seated person is very young, elderly or in an otherwise weakened state. Additionally, the shape the seat attains after driving the body into the seat is not necessarily the shape you want for the body to be in its most restful position. Still further, prior art conformable seating and support structures have a tendency to maintain their evacuated and contoured shape even after air has been reintroduced because the friction between the compressed beads makes the beads stay clumped together even after the vacuum is broken.

Consequently, there is a need for a conformable seating or support structure, which will readily and accurately conform to the contours of an object or body placed thereon without requiring undue body motion. Furthermore, there is a need for a conformable support structure which will quickly and completely resume its neutral position when the supported object or body is removed, thus preparing the structure to receive another body or object. Still further, there is a need for a support structure which will comfortably and securely conform to and support any size or shape of body in a variety of different support situations. The present invention, as disclosed below, achieves these and other objectives as will become apparent from the summary of the invention and detailed description given hereinbelow.

SUMMARY OF THE INVENTION

The support structure of the present invention provides a degree of conformability and support not achievable with prior art conformable support and seating structures. Specifically, the present invention utilizes a multi-layer support system preferably comprising two fluid-sealed layers which are generally adjacent and co-extensive with each other. The first sealed layer is conformable and contains a plurality of beads or beadlike structures which move freely around each other within the layer when a sufficient amount of fluid, such as air, is introduced inside the first layer. When the fluid is removed by vacuum or otherwise evacuated from the first layer, the beads resist motion and the first layer sets into a specific shape. A second sealed layer lies behind or beneath the first layer and is coupled to and co-extensive with at least a portion of the first layer such that motion of the second layer causes motion of a portion of the first layer. Preferably, the first and second layers are co-extensive with each other along, generally, their entire surfaces such that the first layer moves in complete conjunction with the second layer.

In operation, a fluid such as air is introduced into the first layer and the beads in the first layer move freely therewithin. An object such as a human body is placed in contact with or on top of the first layer to be supported and protected by the first layer. Under the weight of the body or another force directing the body against the first layer, some of the beads are displaced so that the first layer partially conforms to the human body contours.

Next, air or another fluid is introduced into the fluid-sealed second layer which lies below or behind the first layer. When air is introduced into the second layer, the second layer expands and pushes against a solid seat frame or other rigid support structure to drive the first layer toward the body. The additional force on the first layer by the expanded second layer displaces an additional amount of beads and further conforms and molds the first layer to the contours of the supported body. The second layer is also conformed and molded to the body contours by the weight of the body in relation to the solid seat frame or other rigid support structure.

After the first bead-filled layer has been conformed by the weight of the body and the second layer has been expanded with fluid to further conform and mold the first layer, the fluid is evacuated from the first layer to inhibit the motion of the beads and to set the first layer to a rigid shape which follows the contours of the body. Specifically, evacuating fluid from the first layer creates a vacuum in the first layer and inhibits the motion of the beads such that the first layer maintains the preevacuation molded contour that it assumed under the weight of the body.

Therefore, the resulting multi-layer support structure is more efficiently contoured to the surfaces of the supported body because the second layer moves and molds the first layer and actively conforms the layer to the body surfaces as opposed to relying upon the weight, pressure and motion of the body alone to accomplish the entire conforming as is done with prior art support structures. Therefore, the finished conformed support surface has an evacuated, rigid first layer to support the body and an inflated second layer to cushion and support the body and first layer on the solid seat frame.

For further efficient contouring according to the principles of the present invention, one preferred embodiment of the multi-layer support system utilizes a first layer which is compartmentalized into individual bead-filled compartments. The beads in the first layer compartments are contained within each compartment and generally cannot travel from compartment to compartment; however, the individual compartments are in fluid communication with each other and fluid is free to pass between each of the individual compartments. Compartments prevent the beads from settling or accumulating in one portion of the layer. Further, compartments provide a smaller displacement distance for the beads to travel when the first layer is conformed so that the first layer is more accurately molded. In another variation of the invention, both the first layer and the second layer are compartmentalized. The compartments of the second layer provide individual and selective manipulation of the various first layer compartments. Selective inflation/deflation of the layers is utilized to form a contoured first layer.

Preferably with the compartmentalized layers, there are a greater number of second layer compartments than first layer compartments. In that way, one or more second layer compartments are used to mold a single first layer compartment. With a plurality of second layer compartments contiguous with a single first layer compartment, a compartment of beads may be selectively molded by filling or evacuating selected second layer compartments. To that end, both layers may be connected to the same fluid supply system so that the first and second layers are filled or evacuated in conjunction with each other according to the objectives of the present invention.

In still another alternative embodiment of the present invention, the compartments of both layers are not in fluid communication with each other but rather are individually fluid-sealed, with each compartment coupled to a fluid supply system by a separate, dedicated fluid line and appropriate valving. This allows further selective inflation and evacuation of the individual sealed compartments to more efficiently and accurately conform the multiple layers to the contours of the supported body. Furthermore, by having each of the compartments of both the first and second layers function in this manner, the integrity of the total system is not jeopardized if any one given compartment ruptures. Specifically, only the compartment in which the rupture occurs is affected, not the total system.

When one person leaves the support structure, the second layer is used to erase the conformed surface of the first layer when fluid is re-introduced into the first layer to break the vacuum. Evacuating the second layer when the vacuum in the first layer is destroyed moves the first layer and thus moves the beads, breaking up whatever rigid structure they maintained under vacuum. For stubborn bead rigidity and first layer "memory", the second layer may be filled and evacuated several times to disperse the first layer beads. In that way, the first layer is again ready to receive and conform to another body.

While one variation of the present invention utilizes a seating structure, the multi-layer support system may be utilized with various other mechanical structures including helmets, such as motorcycle, football or aircraft helmets, child safety seats, as illustrated and discussed below, and other related structures. Further potential uses for a multi-layer seating structure are limitless and may include, automobiles, commercial aircraft, professional racing vehicles, rollercoasters, military aircraft, virtual reality games and any other use where it is desirable to provide conformable, secure body support for a variety of different body shapes and sizes.

Accordingly, the present invention provides a multi-layer conformable support system which may be adapted to fit the exact contours of a human body or some other object supported thereby. Compartmentalized first and second layers provide a more accurate contour and achieve a near-perfect fit with minimal motion and pressure by the body being supported. Furthermore, the second layer supports the body and is used to make the first bead layer assume its rest position. Consequently, the multi-layer conformable system provides a seating and support structure which conforms better than prior art structures and produces better comfort, support and securement of a body. These objectives and other objectives of the present invention will become more apparent in the detailed description of the invention hereinbelow.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 1 is a side view, of a seating structure utilizing the multi-layer conformable system of the present invention.

FIG. 2A is an enlarged section of FIG. 1, partially cut away, with the first layer inflated and the second layer evacuated, while FIG. 2B is a figure similar to FIG. 2A depicting the first layer evacuated and the second layer inflated.

FIG. 3A is a front view partially in section of an alternative seating structure utilizing the multi-layer conformable system of the present invention with the first layer inflated and the second layer evacuated, while

DETAILED DESCRIPTION OF THE INVENTION

Figure 3A:
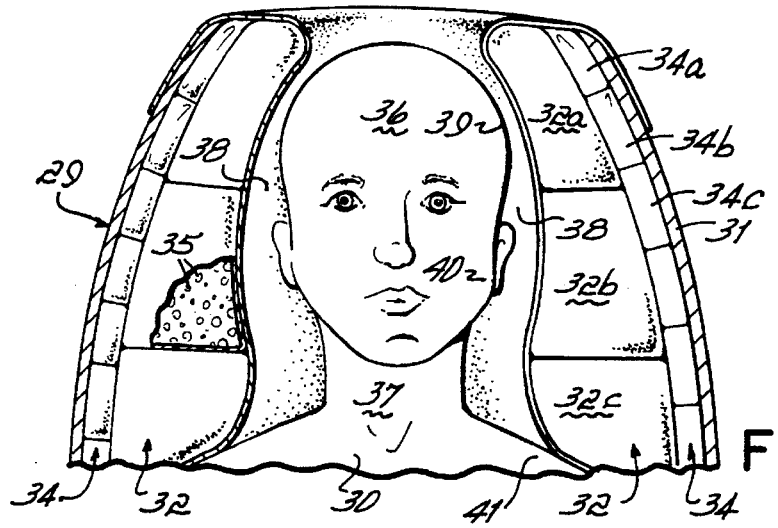

In accordance with the principles of the present invention, the multi-layer conformable system may be utilized with a number of different support structures. FIG. 1 shows the multi-layer conformable system of the present invention utilized with a common seating structure 10. Seating structure 10 has a rigid seat frame 12 made of a material such as wood, steel, fiberglass, or a rigid plastic which is supported by a rigid base 13 constructed of similar or different materials. Adjacent rigid seat frame 12 and supported thereby is a first fluid-sealed layer 14 which contacts and supports a person 15 seated in the seating structure 10. The first layer 14 is fluid-sealed by a cover such as fluid-tight cover 17 which is pliable to allow first layer 14 to conform to the contours of body 15. Referring to FIG. 2A, first layer 14 contains a plurality of bead-like structures or beads 18 which move around each other inside the first layer 14 to conform and mold the layer as described in greater detail hereinbelow. Behind and beneath first layer 14 is a second fluid-sealed layer 16 which also preferably includes a pliable, fluid-tight cover 19. Second layer 16 is co-extensive with at least a portion of first layer 14 and preferably the two layers are co-extensive along their entire surfaces. Second layer 16 is similarly conformable like first layer 14, but second layer 16 does not contain a plurality of beads. Both layers 14 and 16 are coupled to a fluid supply system 20 by fluid lines 8, 9, respectively to be filled and evacuated with a fluid such as air in order to conform the layers to the body contours of a seated person 15.

The operation of the present invention is illustrated in more detail by reference to FIGS. 2A and 2B. FIG. 2A shows a person 15 in contact with the seating structure 10 of FIG. 1, and therefore, like numbers between the Figures refer to like components. A first layer 14 is deformable and contains a plurality of generally circular beads 18 within. The first layer 14 is fluid-sealed by cover 17 and defines a volume. When a fluid such as air is introduced into layer 14 by a fluid supply system 20, the beads have enough free volume or space inside the layer 14 to move freely around one another. The beads are generally spherical and may be of a variety of sizes provided they move around each other to allow the layer to be easily conformed. One preferable size is that referred to as "BB" size. The invention preferably utilizes air as the operative fluid inside the layers, and the word "air" is utilized throughout the specification; however, it should be understood that "air" is meant to collectively include other fluids as well, such as liquids or specific gases which might also be used in the present invention.

To introduce air to the first layer 14, the air does not have to be actively pumped into first layer 14. Rather, a valve (not shown) might be opened within fluid supply system 20 to allow air to simply flow or be drawn into layer 14 by a pressure differential between the inside of the layer and the outside atmosphere. With the beads 18 moving freely within layer 14, the beads 18 are displaced and layer 14 is deformed under the weight and pressure of body 15.

Referring again to FIG. 2A, head region 21 of body 15 indents an area 22 of first layer 14 while the shoulder region 23 indents a lower area 24 of first layer 14. Other body regions will indent other first layer areas, such as the leg and buttocks areas. When areas of first layer 14 are indented, the beads 18 are displaced and move around each other within first layer 14. In that way, the first layer 14 partially conforms and molds to the contours of body 15 presenting a contoured layer which matches the contours of body 15.

Second layer 16 lies behind layer 14 and is also fluid-sealed and in communication with fluid supply system 20. When body 15 settles into the seating structure 10, air is evacuated from second layer 16, whereby second layer 16 shrinks in size to provide for expansion and movement of first layer 14 and motion of beads 18. Again, the second layer 16 does not have to be actively evacuated by the fluid supply system 20. Instead a valve (not shown) coupled to second layer 16 by system 20 might be opened to allow air to flow out of layer 16 when the layer is compressed by the weight of body 15 on first layer 14.

While such body weight and pressure partially conforms a bead layer like first layer 14 and displaces an amount of beads 18, with only a single bead layer the person 15 within seating structure 10 would have to move around or wiggle into the layer to settle their body 15 further into layer 14 to displace a sufficient number of beads 18 to provide proper conformation of the first layer 14. This may be difficult to do for certain persons including the very young and the elderly. Furthermore, the structure of the seat may make such motion impossible or very difficult. Still further, the shape the body assumes after such motion may not be that of the body at rest, and the person may, therefore, be uncomfortable. The present invention eliminates the need for such secondary movement by the seated person 15 and promotes easy and efficient conformability of the seating structure 10 by utilizing the second layer 16. Layer 16 is generally co-extensive with at least a portion of layer 14 and preferably co-extensive with a large portion of layer 14 such that movement of layer 16 causes movement of a large portion of layer 14.

Referring now to FIG. 2B, when body 15 has assumed the seated position and a portion of the beads 18 have been displaced within first layer 14 to initially conform the first layer as discussed above, air is introduced into second layer 16 to inflate or expand the second layer. Fluid supply system 20 introduces air into second layer 16 at a pressure great enough to inflate and expand second layer 16. When second layer 16 is expanded, it drives first layer 14 toward the seated body 15. As first layer 14 is driven toward body 15, more beads 18 are displaced and layer 14 further conforms and molds to the contours of body 15. For example, in FIG. 2B, the size of indented first layer area 22 supporting the head region 21 increases along with an increase in the size of the indented shoulder area 24 supporting shoulders region 23.

Furthermore, the first layer 14 is moved to contact and conform to additional body contours. For example, when second layer 16 is evacuated and the person is seated, as shown in FIG. 2A, the neck region 27 of body 15 generally does not make contact with first layer 14. Therefore, the neck region 27 would be unsupported by seating structure 10 unless further aggressive movement of body 15 can displace enough beads 18 to sink the body 15 deeper into layer 14 and to make first layer 14 conform to the neck region 27. The second layer 16 of the present invention molds the first layer 14 to the contours of the neck region 27 of body 15 without requiring additional aggressive motion by body 15.

When second layer 16 is filled with air to expand layer 16, it moves a portion of first layer 14 forward to contact neck region 27 to support and protect the neck of the seated person. Other indented areas of the body 15 such as the small of the back will also be supported in this way. Therefore, the second layer 16 in conjunction with first layer 14 produces more efficient contouring and molding of the first conformable layer 14 of seating structure 10 without requiring increased pressure or motion from the body 15. As a result, a more properly conformed seat protects and supports a person seated within seating structure 10.

As may be appreciated, the application of the invention may require the air to be introduced into first layer 14 at a different pressure than the air introduced into second layer 16. Since first layer 14 is partially expanded due to beads 18, the purpose of the air is to allow the beads to move around in the layer 14. However, the second layer 16 has to be inflated or filled with air to partially lift the weight of body 15 and also to aggressively drive the first layer 14 around the contours and curves of body 15. Accordingly, the delivery pressure of the air to second layer 16 may be greater than the pressure for first layer 14.

When second layer 16 has been adequately filled with fluid or inflated with air to further conform layer 14 and envelop body 15, the air is evacuated from the first layer 14 by fluid supply system 20 and line 8. The evacuation of air from first layer 14 draws fluid-tight covering 17 inwardly and, consequently, decreases the volume within the first layer 14 and brings the beads 18 closer to each other. The air gaps 25 between the beads 18 are generally made smaller or are generally closed such that the beads 18 are squeezed together (for example, see FIG. 2A versus the layer compression of FIG. 2B). The increased contact and friction between the squeezed beads 18 inhibits their motion within first layer 14. When the motion of the beads 18 is inhibited, first layer 14 becomes rigid and sets, thereby holding its shape. The first layer 14 will, thereby, maintain the pre-evacuation contours that were impressed upon the first layer 14 by the weight of body 15 and by the conforming motion of first layer 14 due to the expansion of second layer 16.

Hence, first layer 14 becomes a rigid, contoured layer which matches the contours of the body 15 and supports and protects body 15 comfortably in accordance with the principles of the present invention. The underlying second layer 16 provides a further layer of comfort and support for body 15 by conforming and supporting contoured first layer 14 on a cushion of air above rigid seat frame 12. Since layer 16 is filled with air, it also conforms somewhat to the body contours due to the pressures of body 15 and the shape of the contours in first layer 14.

The seating structure 10 shown in FIGS. 1, 2A and 2B may be utilized in any variety of applications, such as in automobiles, aircraft, amusement park rides and as a stationary seat support. The conformed seating structure 10 utilizing the multi-layer system of the present invention provides safer and more comfortable support for a passenger and/or operator of an aircraft or vehicle. The present invention further conforms to any size and shape of body and also to various different bodies in succession as the conforming first layer of seat structure 10 may be conformed and re-conformed a virtually infinite number of times.

When the seated person 15 arises from seating structure 10, the contoured first and second layers 14, 16 will retain their shapes as long as the fluid system 20 maintains the first and second layers 14, 16 in an evacuated and inflated condition, respectively. If it is desirable to prepare the seating structure 10 to receive a different body, the rigid, contoured first layer 14 must be returned to its neutral position with the contours generally removed. To do so, air is introduced back into first layer 14 by fluid system 20. The introduced air, which may be forced in or may be allowed to just flow in, causes expansion of covering 17 thus increasing the area inside first layer 14 and, consequently, creating air gaps 25 between the individual beads 18. The beads 18 will again freely move around each other within first layer 14 to remove any contours and return the layer to its neutral position.

However, it has been found through experimentation and is a recognized problem in the prior art that the beads of a conforming layer, such as beads 18, once pressed together, tend to stay pressed together in the evacuated position even after air has been re-introduced into the layer. That is, the beads 18 tend to have a "memory", and thus, maintain their packed, contoured shape even when the layer is no longer evacuated. The present invention prevents such bead "memory" by moving the beads around to break up any fixed clumps of beads. Second layer 16 is used in accordance with the principles of the present invention to manipulate first layer 14, thereby moving beads 18, and preparing layer 14 to receive a different body. More specifically, when air is introduced into first layer 14 to produce and allow bead movement, second layer 16 is evacuated to draw the second layer covering 19 inward and thereby draw first layer 14 toward the seat frame 12. The first and second layers are preferably co-extensive and connected such that motion of the second layer 16 causes motion of the first layer 14. Moving first layer 14 by inflating and deflating second layer 16 breaks up the fixed clumps of beads such that they again move around each other in layer 14.

Therefore, second layer 16 is used to eliminate the evacuated "memory" of beads 18 in the first layer 14. Should the "memory" of the conformed beads 18 be somewhat strong, that is, should the frozen beads remain set after the second layer 16 is deflated, the second layer 16 may be inflated and evacuated again several times to generally shake the first layer 14 and break up the beads 18. The multi-layer seating structure 10 is then again ready to receive a body 15 or other object to be supported.

In summary, a person sits within the seating structure 10 while air is introduced or forced into the first conformable layer 14 and evacuated or released from the second layer 16. The body weight of the person partially conforms first layer 14 by moving beads 18. Subsequently, air is introduced or forced into the second layer 16 to further move first layer 14 and beads 18 to conform and mold the first layer 14 to the contours of the seated person. Finally, air is evacuated from the first layer 14 to inhibit the motion of the beads 18 and set the first layer 14 into a rigid, contoured shape which matches the contours of the seated person. Introducing air into the first layer 14 and evacuating the second layer 16 will then return the first layer 14 to a nonconformed position.

In one embodiment of the present invention, each layer might be defined by a unitary volume wherein the beads and fluid are free to move anywhere throughout the layer. However, other embodiments of the invention utilize layers that are divided into individual compartments. FIGS. 2A and 2B show first layer 14 and second layer 16 divided into individual compartments, for example, compartments 14a, 14b, 14c, and 16a, 16b, 16c, respectively. The first layer compartments 14a, 14b, 14c are formed as separate chambers within cover 17 to contain beads 18. While such compartments are not necessary for the proper operation of the present invention, they are preferable to create a more efficient and accurate contouring of the first and second layers 14, 16. Compartments 14a, 14b, 14c each contain a portion of beads 18 and hold the respective portions of beads 18 in a certain position with respect to the entire layer 14 and the other beads 18. The individual compartments of beads 14a, 14b, 14c, are easier to conform to a specific contour because the beads remain in a generally small volume and consequently, do not need to be displaced very far when the compartment volume is contoured or indented. Therefore, less weight or force is needed to accurately contour a small compartment as shown.

Furthermore, the individual layer compartments prevent the beads from moving and accumulating in one area of the layer 14. For example, under the influence of gravity a large quantity of the first layer 14 beads may drop to the bottom of layer 14 leaving no beads to be contoured at the top of layer 14 near the head, neck and shoulders of the seated person 15. Without individual compartments of beads 14a, 14b, 14c, the beads 18 would have a tendency to settle and accumulate at the lowest point of layer 14 degrading the conformability of the layer.

The compartments 14a, 14b, 14c and any other first layer 14 compartments of the embodiment of the invention disclosed in FIGS. 2A, 2B are, nevertheless, in fluid communication with each other so that any air introduced by fluid supply system 20 passes easily from compartment to compartment to facilitate inflation and evacuation of layer 14.

Figure 3B:
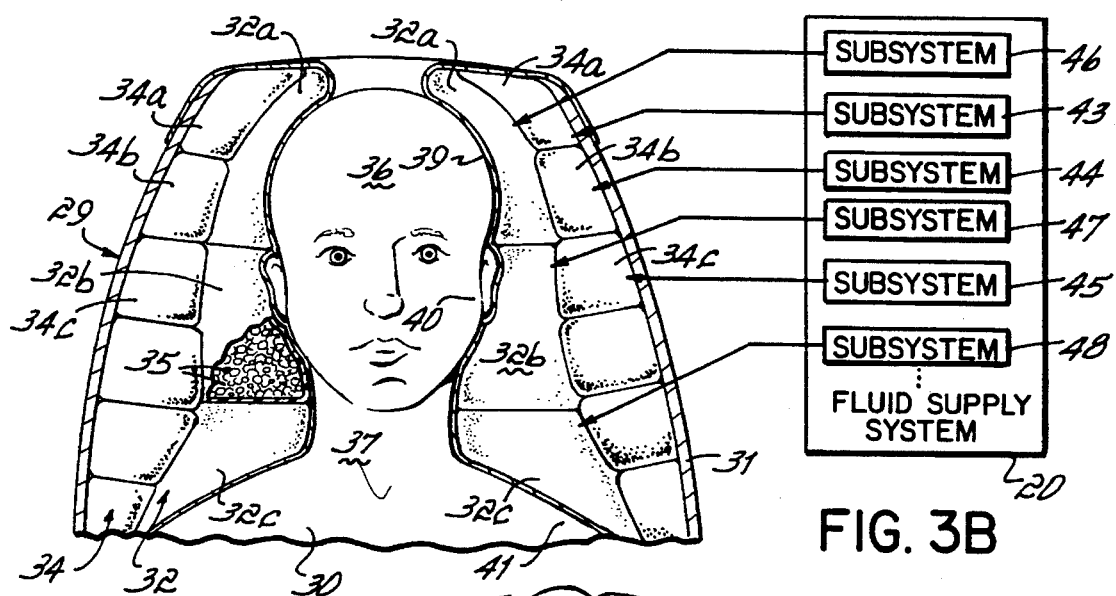
FIG. 3B is a front view similar to FIG. 3A with the first layer evacuated and the second layer inflated.

In an alternative embodiment of the present invention, as shown in FIG. 3B and discussed in greater detail below, each individual compartment may have an associated fluid subsystem coupled thereto through appropriate valving and may be individually fluid-sealed such that individual compartments of layer 14 are selectively filled and evacuated at different air pressures or vacuums, respectively. Individual, fluid-sealed compartments may be further selectively contoured.

As seen in FIGS. 2A, 2B, second layer 16 is also preferably divided into individual compartments such as compartment 16a, 16b, 16c. The individual compartments 16a, 16b, 16c are in fluid communication with each other such that air pumped from fluid supply system 20 passes through the individual compartments to adjacent compartments. Compartments 16a, 16b, 16c of second layer 16, while allowing air to flow through layer 16, may be separately valved (not shown) to contain the air in pockets to prevent air from completely leaving one region of second layer 16 and inordinately bulging another region of second layer 16. With an uncompartmented second layer 16, there is a tendency for air to be pushed completely out of certain regions of the layer by the weight of body 15. This leaves areas of the first layer 14 pressed directly against rigid seat frame 12 without any support from second layer 16. The air, in turn, is pushed to other less weighted regions causing bulging in certain areas of the second layer 16 which may cause the layer 16 to rupture, and thus, be rendered ineffective. Compartments, 16a, 16b, 16c, keep the air generally equally distributed about layer 16, preventing bulging and ruptures of second layer 16.

In a preferred embodiment of the present invention, the number of second layer compartments 16a, 16b, 16c is greater than the number of first layer compartments 14a, 14b, 14c. As shown in FIG. 2A, two second layer compartments 16a, 16b, are adjacent and co-extensive with a single first layer compartment 14a. The individual and discrete compartments 16a, 16b provide more efficient conforming of compartment 14a. Specifically, each compartment 16a, 16b only has to move generally half of the first layer compartment 14a, or some smaller portion, if there are more than two individual second layer compartments to a single first layer compartment. Therefore, the first layer compartment 14a is conformed and molded more precisely by the smaller, discrete second layer compartments 16a, 16b.

For example, an upper compartment 16a and a lower compartment 16b are adjacent to the first layer compartment 14a. The greater pressure in the area of lower compartment 16b by head region 21 will cause compartment 16b to be compressed by a slightly greater force than the force compressing upper compartment 16a. Thus air will be directed out of lower compartment 16b, and some of the air will be directed to upper compartment 16a, producing an expansive pressure within upper compartment 16a which pressure and resulting expansion of upper compartment 16a discretely drives the top portion 28 of first layer compartment 14a over the top of head region 21 to further conform first layer portion 28 and provide additional contact and support to head region 21. Therefore, the discrete second layer compartments 16a, 16b, 16c direct air to other adjacent compartments when compressed to discretely conform the first layer 14. Simultaneously, the second layer compartments maintain a proper supporting volume of air within all areas of second layer 16 to support body 15 and provide an air cushion between first layer 14 and rigid frame 12. As will be appreciated, the compartment 16a, 16b and 16c of the second layer may also be coupled to individual fluid supply systems to selectively fill and evacuate the compartments at different pressures as will now be described with an alternative embodiment of the invention disclosed in FIGS. 3A and 3B.

FIG. 3A shows another embodiment of a support structure utilizing the multi-layer support system of the present invention which may be utilized to support a body 30 from the sides such as to prevent side-to-side motion of the body. As may be appreciated, the invention may be utilized to support both the rear of the body and the sides by combining the embodiments of FIGS. 2A, 2B and 3A, 3B into a single seating structure. In FIG. 3A, the support structure 29 includes a rigid frame 31 similar to the frame 12 illustrated in FIGS. 1, 2A, and 2B. A first layer 32 extends downwardly on either side of body 30. A second layer 34 is adjacent and co-extensive with first layer 32 and also extends downwardly on either side of body 30. Layers 32 and 34 are divided into individual compartments, 32a, 32b, 32c and 34a, 34b, 34c, respectively. The compartments of first layer 32 each contain a plurality of beads 35 which move around each other within the first layer compartments.

A person 30 is seated in or lies down on structure 29, and air is introduced or forced into the first layer compartments 32a, 32b, 32c to allow the beads 35 to move within first layer 32. Simultaneously, air is evacuated or released from layer 34. The weight of the body 30 generally displaces a portion of the beads 35 to mold first layer 32.

When body 30 is positioned generally longitudinally within structure 29, the inflated first layer 32 and second layer 34 do not press completely against body 30 as may be seen in FIG. 3A. The head region 36 and neck region 37 of body 30 do not contact first layer 32 even though first layer 32 does contact shoulder region 41. If first layer 32 were to be evacuated at this point, it would assume a rigid position leaving gaps 38 on either side of the body head region 36 and neck region 37.

However, FIG. 3B shows the resulting contouring which takes place when air is introduced into second layer 34. The air inflates the individual compartments 34a, 34b, 34c of the second layer 34 and drives the compartments of first layer 32 toward body 30. First layer 32 then contacts head region 36 and neck region 37 and the shapes of these body regions displace beads 35 to mold the first layer 32 to the body contours. Subsequently, when air is evacuated from first layer 32, the first layer assumes a rigid conformed shape which matches the contours of the sides of body 30 and supports the sides of the body. First layer 32 maintains its rigid evacuated shape as long as first layer 32 remains evacuated. When the multi-layered system is fully conformed, the second layer 34 will also be slightly contoured as shown in FIG. 3B. Re-introducing air to first layer 32 and evacuating or releasing air from second layer 34 allows the layers to relax to their respective rest positions so that they are ready to receive another body. Again, the second layer 34 may be filled and evacuated continuously if necessary to eliminate any fixed contour that the beads 35 tend to maintain after air is re-introduced into first layer 32.

In the embodiment of the invention shown in FIGS. 3A, 3B, each individual compartment is fluid-sealed from each other so that they may be filled and evacuated independently of the other compartments. Accordingly, the alternative embodiment utilizes a number of separate and independent fluid subsystems which may be used to tailor the evacuation and inflation of the various layer compartments to provide a more accurate and efficient conformable seating structure according to the objectives of the present invention. (See FIG. 3B)

For example, it may be necessary to provide a tighter, more rigid first layer fit in the upper head region 39 to adequately support and protect the skull. However, it may be desirable to have a somewhat looser fit at lower head region 40 and neck region 37 such that the neck and mouth area of the head are not unduly stressed. Accordingly, it would be desirable to exert a greater amount of fluid pressure to second layer compartments 34a and 34b than to compartment 34c in order to drive first layer compartment 32a toward upper head region 39 with more force than used to drive compartment 32b toward lower head region 41 and neck region 37. Additionally, it would be desirable to make first layer compartment 32a more rigid than compartment 32b by evacuating compartment 32a at a greater vacuum than compartment 32b.

The system layers 32, 34 in the embodiment depicted in FIG. 3B are connected to a series of independent fluid supply subsystems, such as subsystems 43, 44, 45, 46, 47 and 48, which operate independently of one another. The layers are connected to the supply subsystems through appropriate valving (not shown). Therefore, to achieve the desired results, fluid subsystems 43 and 44 would introduce air at a greater pressure than fluid subsystem 45, for example. Furthermore, fluid subsystem 46 would evacuate first layer compartment 32a at a greater vacuum than fluid subsystem 47 would evacuate compartment 34b. Such selective fluid introduction and evacuation allows the conformable seat to be tailored to specific applications and body shapes. The comfort of the person sitting or lying in a structure utilizing the embodiment of the multi-layer support system shown in FIGS. 3A, 3B is enhanced to provide rigid support in those areas where such support is necessary but to allow a softer, more comfortable support in those regions where comfort overrides the support concerns. Different compartments within the layers might be constructed of different layer strengths to withstand necessary filling pressures and vacuums required in accordance with the present invention. Thereby, the individual layer compartments are filled and evacuated at different chosen pressures.

While the embodiment of the invention illustrated in FIGS. 3A, 3B is shown utilizing independently-operating fluid supply systems, it should be understood that the embodiment shown in FIGS. 1, 2A, 2B, 4 and 5 of the specification might also use such independently-operating fluid systems and fluid isolated compartments. Similarly, the layers 32, 34 might be inflated/evacuated with a single supply as shown in FIG. 2A. The independent inflation/evacuation and individually fluid-sealed compartment not only allow a tailored conformation of the layers, but also maintains the integrity of the support system should one or more of the compartments rupture. For example, a rupture of a single compartment and subsequent loss of beads and/or fluid would not affect the remaining compartments of the layer. Furthermore, each of the independently fluid-sealed compartments are preferably valved and the fluid supply systems preferably operate such that a rupture of a compartment does not affect the introduction into and evacuation of fluid from the remaining compartments and the rest of the layer. For example, a pressure-sensitive valve (not shown) might be included in the supply system to shut down the supply system to a particular compartment once a rupture has occurred.

Figure 4:
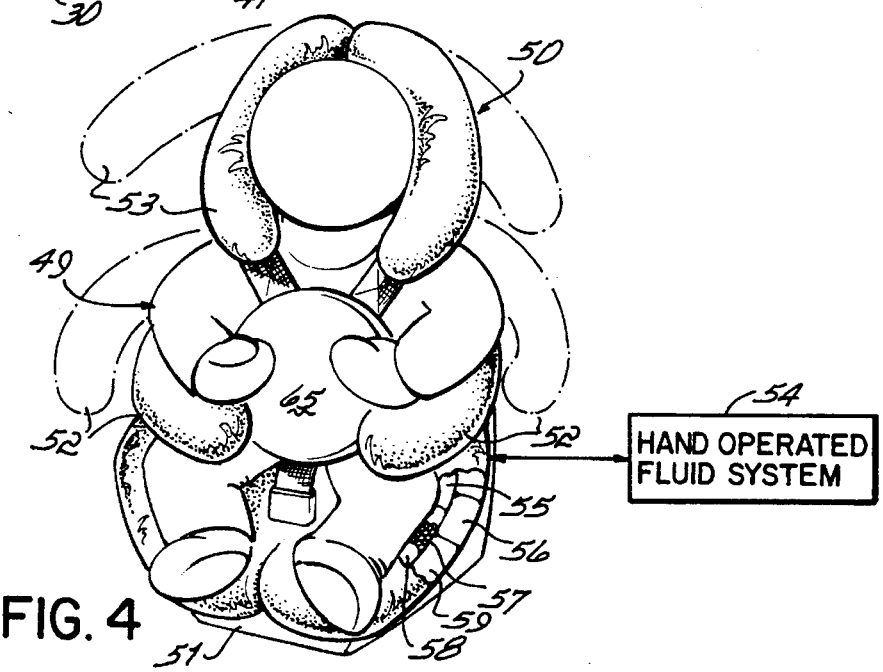
FIG. 4 is a front perspective view of a child seat utilizing the multi-layer conformable system of the present invention.

FIG. 4 shows another variation of a seating structure utilizing the multi-layer support system. A child safety seat 50 contains a base support section 51, waist support section 52, and a head and neck support section 53 wherein each section, including a back support section (not shown), utilizes the multi-layer system of the present invention. Such an embodiment would include a fluid supply system 54, first layer 55, second layer 56, beads 57 and individual layer compartments 58, 59.

While the embodiments illustrated in FIGS. 2A, 2B and 3A, 3B have utilized rigid seat frames which are stationary, the multi-layer system of the present invention might be utilized with a movable support structure. For example, referring to FIG. 4, a child safety seat 50 has a rigid frame 51 and a waist section 52 and neck section 53. The waist section 52, and neck section 53, are configured as movable arms which partially wrap around the body of a child 49 in seat 50. When child 49 is placed within the seat, the arms 52, 53 are spread outwardly from seat 50 to receive the child. Once the child 49 has been placed in seat 50, the arms 52, 53 may be folded over either manually or mechanically to grip respective portions of the body of child 49. The arms may also be used to force the layers against body 49 and mold the layers to the contours of the body. Thereafter, the various layers of the seat are filled and evacuated in accordance with the principles of the present invention to conform the seat and secure body 49. The arms 52, 53 might be secured to seat 50 by a safety strap mechanism 65 as shown. Therefore, the multi-layer support system of the present invention functions to work equally well with rigid support structures and support structures which actively move a portion of the conformable layers into contact with the body or object being supported to further support the body and conform the layers.

Figure 5:
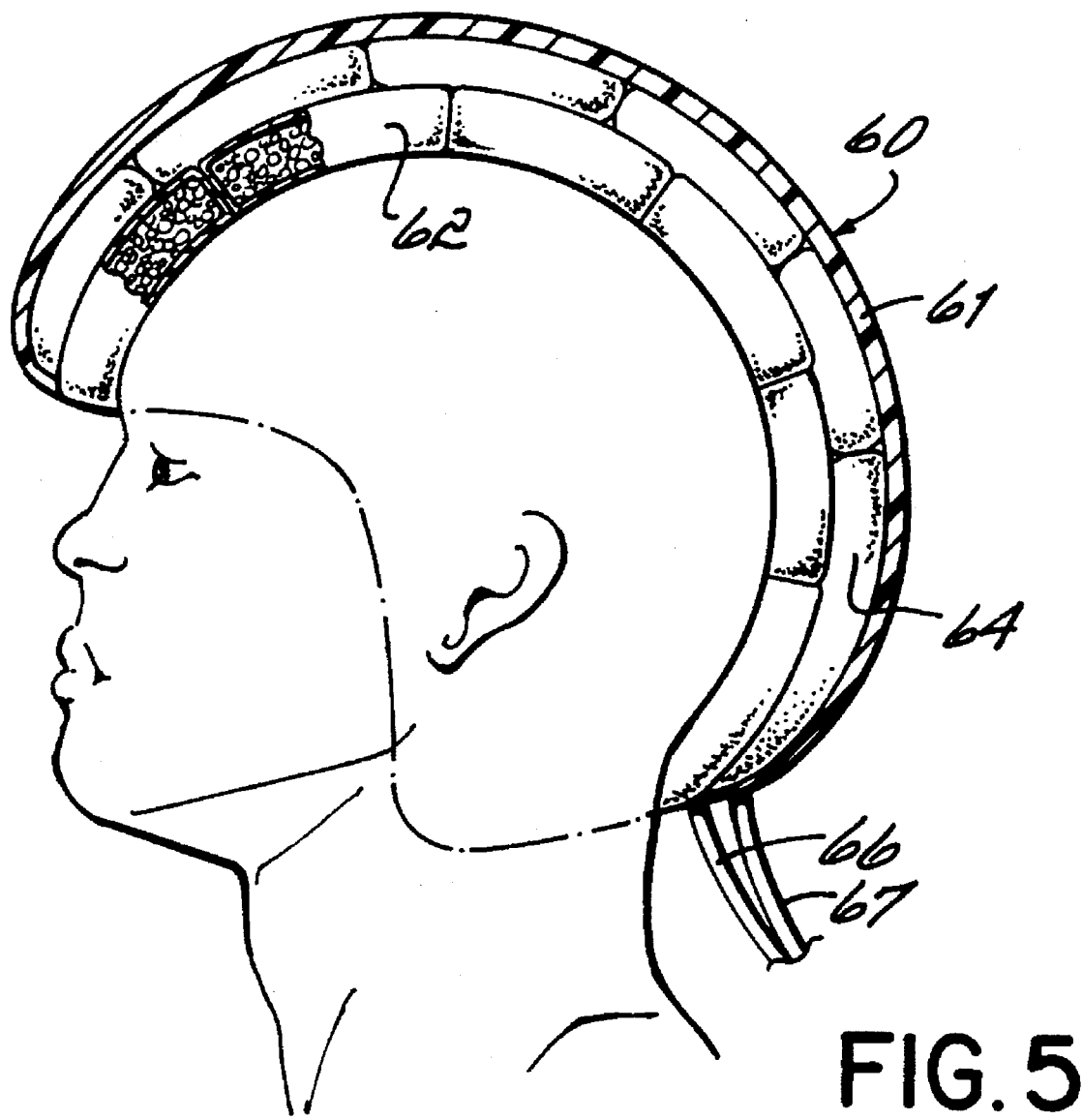
FIG. 5 is a side cross-sectional view of a helmet structure utilizing the multi-layer conformable system of the present invention.

FIG. 5 shows still another variation of a structure using the multi-layer support system of the present invention. Helmet 60 has a hard outer shell 61 made of a material such as plastic. Multiple first and second support layers 62, 64 form the inner surface of helmet 60. The layers 62, 64 are designed to operate in accordance with the principles of the present invention as described hereinabove and hence may be evacuated and inflated to provide a contoured inner-helmet layer to conform to and protect the head of the wearer. Fluid lines 66, 67 inflate and evacuate first and second layers 62, 64, respectively either manually or by a powered fluid supply system as shown in FIGS. 2A, 2B.

While the present invention has been illustrated by the description of various embodiments thereof, and while the embodiments have been described in considerable detail, it is not the intention of the Applicants to restrict or in any way limit the scope of the appended claims to such detail. Additional advantages and modifications will readily appear to those skilled in the art. For example, various other seat and support structures might be used in conjunction with the multi-layer system of the present invention. Additionally, the system is not confined to use only with the human body. Rather structures for supporting and protecting other precious and fragile objects may use the multi-layer system.

The invention in its broader aspects is, therefore, not limited to the specific details, representative apparatus and method, and illustrative examples shown and described. Accordingly, departures may be made from such details without departing from the spirit or scope of Applicants' general inventive concept.

What is claimed is:

1. A multi-layer support system for conforming to and supporting an object comprising:

a first fluid-sealed layer containing a plurality of beads, the first layer comprising a plurality of compartments independently sealed from one another such that fluid may be introduced and evacuated from a first of the fluid-sealed first layer compartments independently from the fluid introduction and evacuation from a second of the first layer compartments, the beads being movable within compartments of the first layer when fluid is introduced to the first layer compartments and being inhibited from motion when an amount of the fluid is evacuated from the first layer compartments, the first layer compartments being conformable to the surface contours of an object placed thereon when fluid is introduced and the beads move freely within the first layer, whereby a rupture of said first compartment does not affect said second of the first layer compartments;

a second fluid-sealed layer adjacent the first layer and external to said first fluid-sealed layer, at least a portion of the second layer moving when fluid is introduced to the second layer, and the first and second layers being coupled together such that movement of a portion of the second layer operatively acts on a portion of said first layer externally of the first layer and causes movement of at least one of said first layer compartments to further conform said first layer;

a fluid supply system in communication with said first layer compartments, the fluid supply system being operable to introduce fluid into the compartments so that the first layer compartments independently conform to the surface contours of an object contacting the first layer, and further being operable to evacuate an amount of fluid from the conformed first layer compartments to inhibit the motion of the beads therein and set the first layer into a rigid contoured layer which follows a portion of the object surface contours, the fluid supply system further in communication with the second layer to introduce fluid to the second layer and move the at least one first layer compartment toward the object to further conform the first layer compartment to the object surface contours;

whereby introducing fluid to the first layer compartments and second layer and evacuating fluid from the first layer compartments provides a rigid, contoured surface which supports the object safely and securely.

2. The multi-layer support system of claim 1, wherein the fluid supply system includes a first layer subsystem to supply and evacuate fluid from the first layer compartments and a second layer subsystem to supply and evacuate fluid from the second layer, the first and second layer subsystems operating in conjunction to introduce fluid to the first layer compartments to conform the first layer compartments, to introduce fluid to the second layer to move and further conform the first layer compartments, and subsequently to evacuate fluid from the first layer compartments to create said rigid, contoured layer.

3. The multi-layer support system of claim 1 wherein the second layer is divided into a plurality of compartments at least two of the compartments being in fluid communication with one another and in fluid communication with the fluid supply system.

4. The multi-layer support system of claim 1 wherein the second layer is divided into a plurality of compartments, the number of compartments of the second layer being greater than the number of compartments of the first layer to more precisely contour said independently sealed first layer compartments.

5. The multi-layer support system of claim 4 wherein a single first layer compartment is adjacent at least two second layer compartments.

6. The multi-layer support system of claim 1, further comprising a helmet structure with a hard outer shell and an inner surface, the first and second layers arranged generally co-extensive with a portion of the inner surface so that the helmet may be precisely conformed to the head of a wearer.

7. The multi-layer support system of claim 1, further comprising a seat structure including a frame with a body support section, the first and second layers arranged generally co-extensive with a portion of the body support section to conform to the body of a person seated in the seat structure.

8. The multi-layer support system of claim 7, wherein the seat structure further includes movable members which support a portion of both the first and second layers, the movable members being movable to bring the first and second layers into contact with the body to secure the body in the seat structure and further conform the first layer.

9. The multi-layer support system of claim 1, wherein the second layer comprises at least one compartment which is fluid-sealed independently from the rest of the second layer such that fluid may be introduced and evacuated therefrom independently from the introduction and evacuation in the rest of the second layer, whereby a rupture of the compartment does not affect the rest of the second layer.

10. The multi-layer support system of claim 1 wherein the second layer comprises a plurality of compartments fluid-sealed independently from one another such that fluid may be introduced and evacuated from at least one of the fluid-sealed compartments independently from the fluid introduction and evacuation of another fluid-sealed compartment.

11. The multi-layer support system of claim 1 wherein the second layer comprises a plurality of compartments independently sealed from one another such that fluid may be introduced and evacuated from at least one of the fluid-sealed second layer compartments independently from the fluid introduction and evacuation of another of the fluid-sealed second layer compartments.

12. A multi-layer support system for conforming to and supporting an object comprising:

a first fluid-sealed layer containing a plurality of beads, the first layer comprising a plurality of compartments independently sealed from one another such that fluid may be introduced and evacuated from a first of the fluid-sealed first layer compartments independently from the fluid introduction and evacuation from a second of the first layer compartments, the beads being movable with respect to one another inside the independently sealed first layer compartments to allow the first layer compartments to be conformed independently when fluid is introduced into the first layer compartments and being inhibited from motion when an amount of fluid is evacuated from the first layer compartments to set the first layer compartment into a rigid conformed layer, whereby a rupture of said first independently sealed first layer compartment does not affect the second of the independently sealed first layer compartments;

a second fluid-sealed layer adjacent the first layer and external to said first fluid-sealed layer, a portion of the second layer being movable when fluid is introduced to the second layer, the first and second layers being coupled together such that movement of a portion of the second layer operatively acts on a portion of said first layer externally of the first layer and causes movement of at least one of said first layer compartments to further conform said first layer compartments;

whereby introducing fluid to the first layer compartments and second layer moves and conforms the first layer compartments to the contours of an object placed in contact with the first layer compartments and evacuating fluid from the conformed first layer compartments sets the first layer compartments into a rigid, contoured layer following the contours of the object to support and protect the object.

13. The multi-layer support system of claim 12 wherein the second layer is divided into a plurality of compartments, the number of compartments of the second layer being greater than the number of the independently sealed compartments of the first layer.

14. The multi-layer support system of claim 13 wherein a single first layer compartment is adjacent a plurality of second layer compartments.

15. The multi-layer support system of claim 12 wherein the second layer is divided into a plurality of compartments, at least two of the compartments being in fluid communication with one another.

16. The multi-layer support system of claim 12 wherein the second layer comprises at least one independently fluid-sealed compartment which is configured such that fluid may be introduced and evacuated therefrom independently of the introduction and evacuation of fluid in the rest of the second layer.

17. A method for supporting an object with a conforming support surface comprising:

providing a first, conformable, fluid-sealed layer, the first layer comprising a plurality of compartments independently sealed from one another such that fluid may be introduced and evacuated from a first of the fluid-sealed first layer compartments independently from the fluid introduction and evacuation from a second of the first layer compartments, the first layer compartments each containing a plurality of beads which are movable therein when fluid is introduced into the first layer compartments such that the first layer compartments may be conformed, the beads being inhibited in motion when fluid is evacuated from the first layer compartments such that the first layer compartments may be set in a rigid conformed shape, whereby a rupture of said first compartment does not affect said second of the first layer compartments;

providing a second fluid-sealed layer adjacent the first layer compartments and positioning the second layer externally of said first fluid-sealed layer, at least a portion of the second layer moving when fluid is introduced to the second layer, the first and second layers being coupled together such that movement of a portion of the second layer operatively acts on a portion of said first layer externally of the first layer and causes movement of at least one of said first layer compartments;

introducing fluid into the independently sealed compartments of the first layer so that the beads move freely therein and the first layer will conform to the surface of an object placed thereon;

introducing fluid into the second layer to move the second layer portion and externally act on and move said first layer compartments to further conform the first layer compartments to the object surface contour;

evacuating fluid from the first layer compartments for inhibiting the motion of the beads and independently setting the first layer compartments into rigid contoured sections of the first layer to match a portion of the object surface contour;

whereby to provide a rigid, contoured surface which comfortably, safely and securely supports objects placed thereon.

18. The method of claim 17 wherein the second layer is divided into a plurality of compartments, the method further comprising selectively introducing fluid to the various second layer compartments to discretely move and conform the first layer to provide a more accurate conformation to the contour of the object.

19. The method of claim 18 wherein the number of compartments of the second layer is greater than the number of compartments in the first layer, the method further comprising filling at least two second layer compartments to move and conform a first layer compartment to provide a precisely contoured first layer.

20. The method of claim 17 further comprising maintaining at least one of the first layer compartments at a first fluid pressure and maintaining the second layer at a second fluid pressure which is different than the first fluid pressure.

21. The method of claim 18 wherein the number of compartments of the second layer is greater than the number of compartments in the first layer, the method further comprising filling at least two second layer compartments to move and conform a first layer compartment to provide a precisely contoured first layer.

22. The method of claim 17 further comprising:

selectively introducing fluid to the first of the first layer independently sealed compartments at a first pressure; and, introducing fluid to the second of the first layer compartments at a second pressure independent from the first pressure to selectively conform at least two of the compartments of the first layer independently from each other.

23. The method of claim 17 further comprising:

introducing fluid to one of the first layer compartments; and, introducing fluid to another of the first layer compartments independently from the introduction of fluid to the one first layer compartment.

24. The method of claim 17 wherein the second layer includes at least two compartments independently sealed from each other, the method further comprising:

selectively introducing fluid to one of the second layer independently sealed compartments at a first pressure; and introducing fluid to a second of the independently sealed second layer compartments at a second pressure independent from the first pressure to selectively conform at least two of the compartments of the second layer independently from each other.

25. The method of claim 17 wherein the second layer includes at least two compartments independently sealed from each other, the method further comprising:

introducing fluid to the one second layer compartment; and, introducing fluid to the other second layer compartment independently from the introduction of fluid to the one second layer compartment.

* * * * *